US012590613B2

(12) United States Patent (10) Patent No.: US 12,590,613 B2
Singleton et al. (45) Date of Patent: Mar. 31, 2026

(54) PAD SHIELD FOR DISC BRAKE SYSTEM AND METHODS FOR THE USE AND ASSEMBLY THEREOF

(71) Applicant: Bendix Commercial Vehicle Systems LLC, Avon, OH (US)

(72) Inventors: Kurt Singleton, Strongsville, OH (US); Lonnie F. Cool, N. Olmsted, OH (US); Phillip W. Downey, II, Avon Lake, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 426 days.

(21) Appl. No.: 18/383,353

(22) Filed: Oct. 24, 2023

(65) Prior Publication Data

US 2025/0129827 A1 Apr. 24, 2025

(51) Int. Cl.
*F16D 65/00* (2006.01)
*F16D 55/00* (2006.01)

(52) U.S. Cl.
CPC ..... *F16D 65/0081* (2013.01); *F16D 65/0068* (2013.01); *F16D 2055/0016* (2013.01); *F16D 2055/0037* (2013.01)

(58) Field of Classification Search
CPC ............. F16D 65/0081; F16D 65/0068; F16D 2055/0016; F16D 2055/0037
See application file for complete search history.

(56) References Cited

U.S. PATENT DOCUMENTS

| | | | | |
|---|---|---|---|---|
| 3,625,316 | A | 12/1971 | Mori | |
| 7,341,130 | B2 | 3/2008 | Samuelsson | |
| 8,857,575 | B2 * | 10/2014 | Philpott | .............. F16D 65/0977 |
| | | | | 188/73.38 |
| 9,810,276 | B2 | 11/2017 | Roberts | |
| 10,131,327 | B2 * | 11/2018 | Thomas | .................. B60T 1/065 |
| 10,309,470 | B1 * | 6/2019 | Philpott | .............. F16D 65/0075 |
| 11,346,412 | B2 * | 5/2022 | Hecker | ................. F16D 55/226 |
| 11,555,524 | B2 * | 1/2023 | Philpott | .................. F16D 55/22 |

(Continued)

FOREIGN PATENT DOCUMENTS

| | | |
|---|---|---|
| CN | 201842068 U | 5/2011 |
| CN | 110219904 A | 9/2019 |

(Continued)

OTHER PUBLICATIONS

International Search Report mailed May 2, 2025 for International Application No. PCT/US2024/050925.

(Continued)

*Primary Examiner* — Vishal R Sahni
(74) *Attorney, Agent, or Firm* — Crowell & Moring LLP

(57) ABSTRACT
A brake system includes a caliper having an opening and an anchor. The anchor has a through hole. A pad shield includes a shell covering at least a portion of the opening in the caliper and a washer lug having an opening aligned with the through hole. A retainer bar is disposed across the opening in the caliper and engages the pad shield. A retainer pin is disposed through the through hole of the anchor and the opening of the washer lug, wherein the retainer pin engages and holds the retainer bar against the pad shield. A pad shield and methods of using and assembling the air disc brake system are also provided.

23 Claims, 4 Drawing Sheets

(56)                References Cited

U.S. PATENT DOCUMENTS

| | | | | |
|---|---|---|---|---|
| 2006/0042890 A1* | 3/2006 | Samuelsson | ............ | F16D 55/00 |
| | | | | 188/73.1 |
| 2008/0110707 A1* | 5/2008 | Kromer | .................. | F16D 65/00 |
| | | | | 188/218 A |
| 2014/0158481 A1 | 6/2014 | Philpott | | |
| 2014/0158482 A1 | 6/2014 | Philpott | | |
| 2016/0167628 A1 | 6/2016 | Thomas et al. | | |
| 2023/0067490 A1 | 3/2023 | Dorn et al. | | |

FOREIGN PATENT DOCUMENTS

| | | | | | |
|---|---|---|---|---|---|
| CN | 211281350 U | 8/2020 | | | |
| DE | 102009023104 A1 * | 12/2009 | ............ | F16D 55/22 | |
| EP | 3708862 A1 | 9/2020 | | | |
| KR | 20080089010 A | 10/2008 | | | |
| SE | 521411 C2 * | 10/2003 | ........... | F16D 66/021 | |

OTHER PUBLICATIONS

Written Opinion mailed May 2, 2025 for International Application No. PCT/US2024/050925.

* cited by examiner

PAD SHIELD FOR DISC BRAKE SYSTEM AND METHODS FOR THE USE AND ASSEMBLY THEREOF

FIELD OF THE INVENTION

The present application relates generally to a disc brake system, and in particular to a disc brake system having a pad shield, together with methods for the use and assembly thereof.

BACKGROUND

Disc brake systems, such as air disc brake systems, are typically configured with a caliper having an opening, which allows for inspection and servicing of brake pads supported by a carrier on opposite sides of a rotor. The brake pads and rotor may be exposed to water, rocks, debris and other foreign matter entering through the opening in the caliper, which may adversely affect the wear rate of the brake pads and rotor. In some systems, a pad shield may be mounted over the opening to prevent the intrusion of foreign objects. The brake system may also include a retainer bar, which retains the brake pads, and may clamp the pad shield in place on the caliper. Various loose fastener parts, including for example and without limitation: retention pins, capture elements (e.g., cotter pins), snap rings and/or washers may be used to install the retainer bar and pad shield. These loose parts may be susceptible to being dislocated, misplaced and/or lost, for example during installation and disassembly of the disc brake system when replacing the brake pads. Such loose parts, if not accounted for, may damage or increase wear of the brake system and adversely affect the performance of the system.

SUMMARY

The present invention is defined by the following claims, and nothing in this section should be considered to be a limitation on those claims.

In one aspect, one embodiment of a brake system includes a caliper having an opening and an anchor. The anchor has first and second ends and a through hole extending between the first and second ends. A pad shield includes a shell covering at least a portion of the opening in the caliper and a washer lug having an opening aligned with the through hole adjacent to the second end of the anchor. A retainer bar is disposed across the opening in the caliper and engages the pad shield. A retainer pin is disposed through the through hole of the anchor and the opening of the washer lug, wherein the retainer pin engages the retainer bar and holds the retainer bar against the pad shield.

In one embodiment, the pad shield further comprises a retainer lug having an opening aligned with the through hole adjacent the first end of the anchor. The retainer pin is disposed through the opening of the retainer lug.

In another aspect, one embodiment of a pad shield configured for installation on a brake system includes first and second shell sections, a cross member extending between and interconnecting the first and second shell sections and a washer lug connected to the second shell section. The washer lug includes an opening defining a laterally extending axis. In one embodiment, the pad shield may further include a retainer lug connected to the first shell section and having an opening aligned with the opening of the washer lug along the laterally extending axis.

In yet another aspect, one embodiment of a method of assembling a brake system includes covering at least a portion of an opening in a caliper with a pad shield, wherein the caliper includes an anchor having a through hole, and wherein the pad shield includes a shell and a washer lug connected to the shell and having an opening. The method further includes engaging the pad shield with a retainer bar, inserting a retainer pin successively through the through opening and the opening in the washer lug, and engaging the retainer bar with the retainer pin.

In one embodiment, the method further includes providing a retainer lug connected to the shell and having an opening aligned with the opening of the washer lug, and inserting the retainer pin first through the retainer lug opening and then through the through opening.

Various other methods of using and assembling the disc brake system are also provided.

The various embodiments of the disc brake system and components, and methods for the use and assembly thereof, provide significant advantages over other air disc brake systems and methods. For example, and without limitation, integrating the size, shape and/or function of various loose parts into the pad shield may allow for quicker and easier installation. Minimizing the number of loose parts decreases the opportunity for misplacing such parts. Moreover, while previously loose parts, such as a washer, may have an important function for safe operation and performance of the brake system, the integration of such parts into the pad shield also helps avoid missing these parts during installation.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "longitudinal," as used herein means of or relating to a length or lengthwise direction 2, for example a direction running parallel to a retainer bar 82, as shown for example in FIG. 2. The term "lateral," as used herein, means situated on, directed toward or running in a side-to-side direction 4 transverse to the longitudinal direction 2. The term "transverse" means non-parallel. The lateral direction may be an X axis and the longitudinal direction a Y axis, with a third Z axis extending orthogonal to the X and Y axes.

The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Figure 1A:
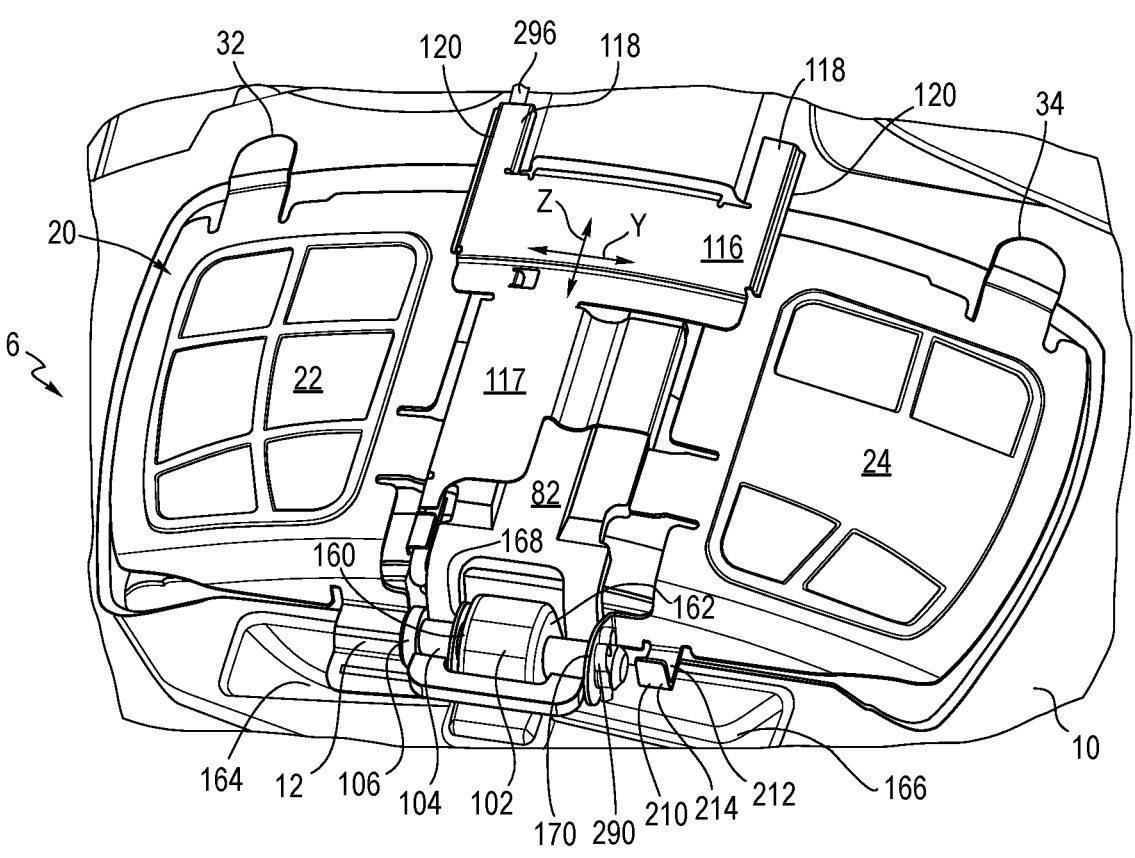
FIG. 1A is a partial first perspective view of one embodiment of a disc brake system.
Figure 1B:
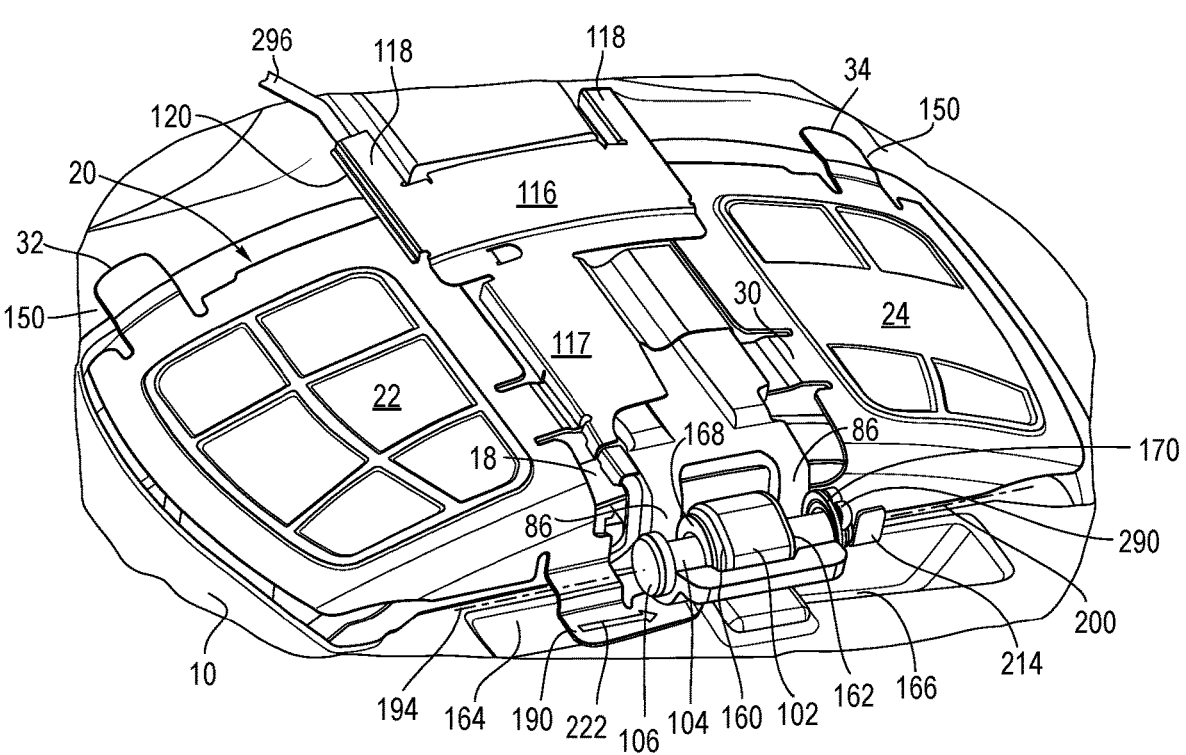
FIG. 1B is a partial second perspective view of one embodiment of the disc brake system shown in FIG. 1A.

Referring to FIGS. 1A and 1B, a disc brake system 6, for example an air disc brake system, includes a caliper 10. Various aspects of the air disc brake system are disclosed in U.S. Pub. No. 2008/0110707, entitled Pad Shield, which is hereby incorporated herein by reference. In such systems, when vehicle brakes are applied, air enters a service brake chamber and operates in a known manner, through a known arrangement, to move an inboard brake pad 16 (FIG. 2) into contact with a rotor (not shown). Movement of the inboard brake pad 16 forces the caliper 10, sliding on guide pins secured to a carrier 12, away from the rotor, which pulls the outboard brake pad 18 (FIG. 2) towards the rotor. The clamping action of the brake pads 16, 18 on the rotor applies a braking force to a vehicle wheel in a conventional fashion. An opening 14 is provided in the caliper 10 to permit inspection and certain maintenance procedures, such as pad replacement. The caliper 10 has a surface 150 defined along one edge of the opening 14 and an anchor 102 disposed along an opposite edge of the opening. The anchor 102 may be configured as an upstanding lug extending from a surface along the Z axis. The anchor 102 has laterally spaced ends 160, 162 and a through hole 87 extending between the ends 160, 162. The caliper 10 has a pair of laterally spaced troughs 164, 166 positioned on opposite sides of the anchor 102.

Referring to FIGS. 1A, 1B, 2 and 3, a pad shield 20 is mountable on the caliper 10 and covers at least a portion of the opening 14 in the caliper. The pad shield 20 helps prevent various dirt, water from road spray and other debris from entering the opening 14 and contributing to the premature wear of the pads. In one embodiment, the pad shield 20 is a one-piece metal or metal alloy stamping, although it is also conceivable to make the pad shield of molded or injected plastic material, or of a composite material such as carbon fiber or of other materials with appropriate strength, stiffness, and durability properties, or of multiple pieces, which may be coupled to form an integral, one-piece component for example by fasteners, welding and other suitable devices. In one embodiment, the pad shield 20 includes a shell 19, including in one embodiment a pair of laterally spaced shell sections 22 and 24. The shell sections 22 and 24 are interconnected by a cross member 28, otherwise referred to as a bridge, extending between the shell sections 22, 24, and a second cross member, otherwise referred to and configured as a spring 30, extending between the shell sections 22, 24. The cross member 28 is positioned at an inboard periphery of the shell, while the cross member 30 is positioned at an intermediate location between an outboard and inboard periphery of the shell. Both cross members 28, 30 extend laterally between and connect the shell sections 22, 24.

Figure 3:
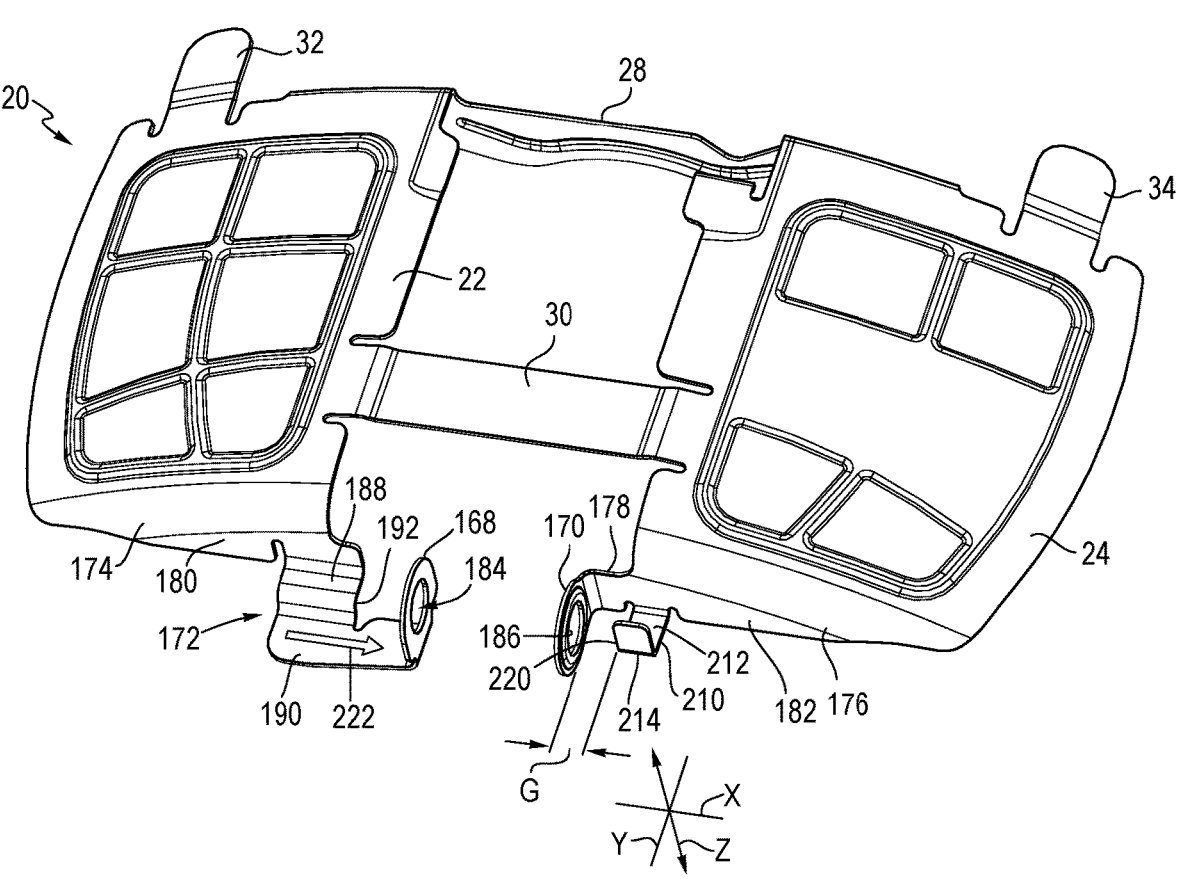
FIG. 3 is a perspective view of one embodiment of a pad shield.

Referring to FIG. 3, the pad shield 20 includes a first tab 32 extending from an inboard edge or side of the shell section 22 and a second tab 34 extending from an inboard edge or side of the shell section 24. The tabs 32 and 34 include contact locations or surfaces, respectively, which engage the surface 150 of the caliper when the pad shield 20 is mounted for use on the caliper.

The pad shield 20 includes a retainer lug 168 directly connected to an outboard edge portion 174 of the first shell section 22 with a connector 172 and a washer lug 170 connected to an outboard edge portion 176 of the second shell section 24 with a connector 178. The first and second shell sections 22, 24 each include an end wall 180, 182 formed along the outboard edges 174, 176 and extending in the Z direction. The retainer lug 168 includes an opening 184 aligned with the through hole 87 adjacent the first end 160 of the anchor 102. The washer lug 170 has a second opening 186 aligned with the through hole 87 adjacent the second end 162 of the anchor 102.

In one embodiment, the connector 172 has a stepped portion, with a first web portion 188 extending longitudinally (Y direction) from the end wall, and a second web portion 190 disposed in the trough 164. In one embodiment, the web portion 188 may temporarily rest on the caliper (e.g., rim 194) prior to the installation of a retainer pin 104, described below, but the web portion 188 preferably does not contact the caliper after the pin 104 is installed. The web portions 188, 190 are connected with a riser web portion 192. The second web portion 190 extends laterally (X direction), with the retainer lug 168 extending orthogonal to the second web portion 190 in the Z direction and lying in the YZ plane, orthogonal to an axis 200 of the through hole 87 and openings 184, 186. The connector 178, which includes a web portion, extends laterally from the second shell section 24 toward the first shell section 22, with the washer lug 170 extending orthogonal to the web in the longitudinal (Y) direction and lying in the YZ plane.

The second shell section 24 also includes a blocker feature 210 extending from the outboard edge 176 in the longitudinal direction. The blocker feature 210 includes a support flange 212 extending from the end wall 182 in the longitudinal (Y) direction, and an upstanding blocker flange 214 lying in the XZ plane and extending from the support flange 212 in the Z direction. The blocker flange 214 is axially aligned with the opening 186 of the washer lug 170 and the opening 184 of the retainer lug 168. An inner edge 220 of the blocker feature 210 is laterally spaced apart from the washer lug 170, or outside of the washer lug, so as to form a gap (G) therebetween. The gap (G) is sufficiently wide to permit installation of a capture component 290, as discussed in more detail below, but sufficiently narrow so as to preclude installation of the pin 104 first through the opening 186 and then through the through hole 87. The blocker feature 210 serves as a poka yoke to ensure that a retainer pin 104 is able to be installed in only one direction through the retainer lug 168, anchor 102 and washer lug 170, as further explained below. The connector portion 172, and the web portion 190 in particular, may also include instructional indicia 222 for installing the retainer pin 104 through the first and second openings 184, 186. In one embodiment, the instructional indicia 222 is configured as a directional arrow to instruct the user as to the proper installation direction.

The pad shield 20 is designed so that, when in use, it largely or predominantly closes off the opening 14 provided in the caliper 10 to shield the brake rotor and brake pads from water, rocks, and debris. To mount the pad shield 20 to the caliper 10, the pad shield 20 is initially placed over the opening 14 so that the contact locations or surfaces of the tabs 32, 34, webs 188, 190 and flange 212 may rest on corresponding locations on or portions of the outer surface of the caliper 10 prior to installation of the pin 104. At the same time, the retainer lug 168 and washer lug 170 are positioned on opposite sides of the anchor 102 so as to properly locate the pad shield 20 on the caliper 10.

A retainer bar 82 may be used to retain the brake pads 16, 18 on the carrier 12, and also serves to clamp the properly positioned pad shield 20 in place on the caliper 10. Referring again to FIG. 2, the retainer bar 82 includes a flange 80, defining an inboard retainer bar end 84, and U-shaped arms 86 joined together by a connecting portion 88 defining an outboard retainer bar end 90. Together with the rest of the retainer bar 82, the connecting portion 88 and the arms 86 define an aperture 92 adjacent the outboard retainer bar end 90, with the anchor 102, defined in one embodiment as a lug, extending through the aperture 92.

Figure 2:
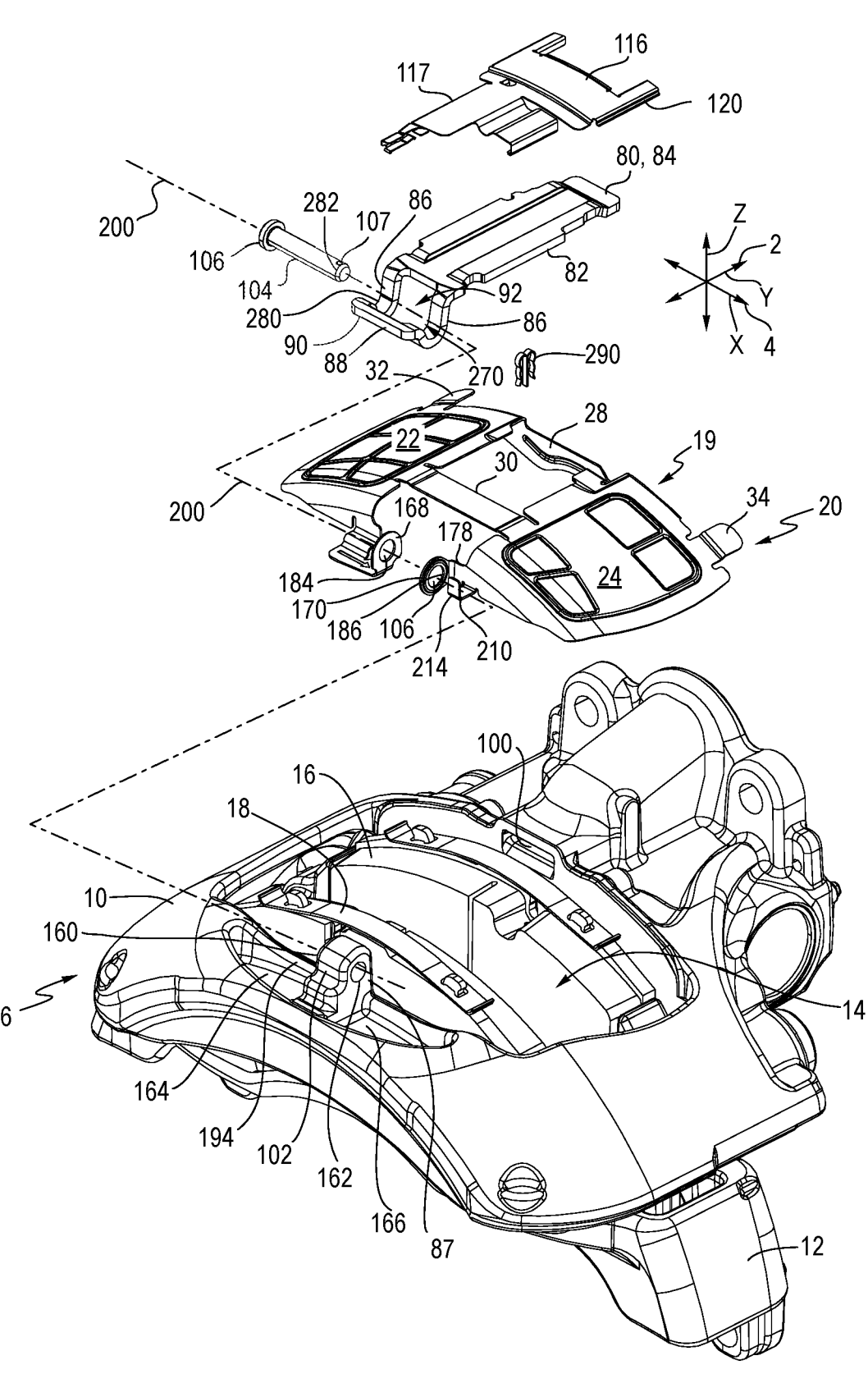
FIG. 2 is a partial exploded view of a disc brake system.

To clamp the pad shield 20 on the caliper 10, the inboard end 84 of the retainer bar 82 is inserted into a groove or recess 100 formed in the caliper 10, as best shown in FIG. 2. In other embodiments, a feature may protrude, or otherwise be configured to retain the retainer bar. The outboard retainer bar end 90 is then pivoted counterclockwise and downwardly about the inboard end 84 until the upstanding anchor 102, integrally formed with or otherwise located on the outboard end of the caliper 10, passes through the aperture 92. The retainer bar 82 is depressed against an upward bias applied by the spring 30 and brake pads 16, 18 until recesses 270 formed by the arms 86 align with the through bole 87 in the anchor 102 and the openings 184, 186 in the connector and washer lugs 168, 170. It should be understood that the anchor 102 may alternatively be configured in other ways, such as in the form of a hook.

After alignment of the arm recesses 270, the through hole 87 and lug openings 184, 186 in the manner discussed, the retainer pin 104 is inserted successively through one of recesses 270, the opening 184 in the retainer Jug 168, the through hole 87, the other recess 270, and the opening 186 in the washer lug 170. The retainer pin 104 has a head 106 engaging an outer surface 280 of the arm 86. The other end 282 of the retainer pin 104 is engaged by a capture component 290 to secure, or lock, the retainer bar 82 in position on the caliper, with the end 282 and capture component 290 located outside of the washer lug 168, or downstream of the washer lug in the insertion direction of the retainer pin 104. The capture component 290 is configured to prevent the end 282 of the retainer pin 104 from passing through the second opening 186 of the washer lug 170 after installation. In one embodiment, the capture component 290 may be configured as a cotter pin that extends through an opening 107 in the end of the retainer pin 104 and is thereafter deformed, or as a snap ring or spring loaded detent extending orthogonal from the end 282 of the retainer pin 104.

Referring to FIGS. 1A and 1B, one arm 86 defining a recess 270 is positioned between the washer lug 170 and the end 162 of the anchor, with the washer positioned outside of the arm 86, or downstream of the arm in the insertion direction of the retainer pin 104. In this way, the washer lug 170 functions as a washer, which circumferentially surrounds the retainer pin 104, to ensure that the capture component 290 is engaged and to prevent axial displacement of the retainer pin 104 in a reverse direction, with any axial forces from the capture component 290 being applied to and distributed by the washer lug 170. The retainer lug 168 is positioned between the retainer arm 86 and the end 160 of the anchor 102. Because of the positioning of the washer lug 170 axially downstream or outside of the arm 86, it is important that the retainer pin 104 be installed in single direction, or always successively inserted through the opening 184, through hole 87 and then the opening 186, with the end 282 and capture component 290 located proximate the washer lug 170. The blocker flange 214, which is aligned with the opening 186, prevents the retainer pin 104 from being first inserted through the opening 186 in the washer lug 170 and then through the through hole 87 and opening 184. The instructional indicia 222, e.g., directional arrow, further instructs the user about the proper installation of the retainer pin 104.

In one embodiment, the blocker feature 210, washer lug 170, retainer lug 168 and pad shell 19, including the shell sections 22, 24, are integrally formed as a single homogenous component. In other embodiments, the various components, including the blocker feature 210, washer lug 170, retainer lug 168 and pad shield may be formed separately and thereafter be coupled or directly connected, for example with fasteners, whether mechanical or by welding and other devices, such that the components define an integral, one-piece pad shield 20. In either embodiment, the washer lug 170 is connected to the pad shield, with the one-piece construction of the pad shield eliminating the need for a loose washer to retain the capture component 290, while also providing a further retention device for securing the pad shield 20 to the caliper 10. In an alternative embodiment, the retainer lug 168 may be omitted, with only the washer lug 170 extending from the shell 19 and being engaged by the retainer pin 104. The blocker feature 210 may also be incorporated into such an embodiment to ensure the proper installation direction of the retainer pin 104.

Pressure applied to the spring 30 by its interference with the retainer bar 82 produces a first resultant force acting on the pad shield. A pressure is applied by the tabs 32, 34. Pressure, and resultant forces may also be applied to the retainer lug 168 and washer lug 170 through engagement with the retainer pin 104 and anchor 102. The forces applied to the pad shield 20 cooperate to retain the pad shield on the caliper 10 in an essentially vibration-free and noiseless manner. Additional features, such as tabs, may be provided to interface with the caliper or other components so as to dampen any vibrations experienced by the pad shield.

Conventional electronic wear indicator sensors (not shown) are optionally mounted in the brake pads 16, 18. If such wear indicator sensors are used, cables 296 extending between the sensors and an appropriate audio and/or visual alarm may be routed next to or on the retainer bar 82 and/or through one or more wire covers 116, 117 adjacent the retainer bar 82. For example, after the cables 296 are fastened in place on the retainer bar 82 by an appropriate cable guide (not shown), the wire guard or covers 116, 117, properly positioned with respect to the caliper 10 by extensions 118, is snapped into place over the cables 296 and the retainer bar and frictionally secured, by lateral flanges 120 (FIGS. 1A, 1B and 2).

It will be understood that removal of the wire guards or covers 116, 117, the retainer bar 82, and the pad shield 20 from the caliper 10 may be effected by reversing the procedure discussed above.

The disclosed pad shield does not require additional mechanical fasteners and advantageously "nests" on the top of the caliper. Retention is provided by way of a "spring" element 30, incorporated into the pad shield 20, which contacts the retainer bar 82. The pad shield provides a low-cost way to prolong the lives of brake pads, rotors, and other wheel end parts by shielding those items from debris, while simultaneously eliminating the need for a loose washer.

The spring 30 is preferably located so that, when the rotor and the pads 16, 18 are fully worn, the spring 30 is centered above the rotor. This allows the pad shield 20 to be held in place, with the retainer bar 82, without affecting sliding of the inboard pad retention spring on the retainer bar. Again, the spring 30 is designed to have a nominal interference with the pad retainer bar such that, after installation, there is a downward force applied to the pad shield 20, preventing rattling and noise.

In operation, and during assembly, one method of assembling a disc brake system include covering at least a portion of the opening 14 in the caliper 10 with the pad shield 20, inserting a retainer pin 104 successively through the opening 184, the through hole 87 and then the opening 186, and engaging the retainer bar 82 with the retainer pin 104. The method may further include engaging the end 282 of the retainer pin downstream of the washer lug 170 with a capture component 290 so as to thereby prevent the end 282 of the retainer pin 104 from passing through the opening 186 of the washer lug 170. The blocker feature 210 functions as a poka yoke to ensure that the pin 104 may be installed in only one direction through the retainer lug 168, anchor 102 and washer lug 170, such that the end 282 of the pin 104 is guaranteed to be located adjacent the washer lug 170, whereinafter it may be engaged with the capture component 290.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A brake system comprising:
   a caliper comprising an opening and an anchor, wherein the anchor comprises first and second ends and a through hole extending between the first and second ends;
   a pad shield comprising a shell covering at least a portion of the opening in the caliper and a washer lug connected to the shell and having an opening aligned with the through hole adjacent the second end of the anchor;
   a retainer bar disposed across the opening in the caliper and engaging the pad shield; and
   a retainer pin disposed through the through hole of the anchor and the opening of the washer lug, wherein the retainer pin engages the retainer bar and holds the retainer bar against the pad shield.

2. The brake system of claim 1 wherein the pad shield further comprises a retainer lug having an opening aligned with the through hole adjacent the first end of the anchor, and wherein the retainer pin is disposed through the opening of the retainer lug.

3. The brake system of claim 2 wherein the shell, retainer lug and washer lug are integrally formed as a single homogenous component.

4. The brake system of claim 2 wherein the pad shield comprises a connector portion extending between the shell and the retainer lug, wherein the connector portion comprises instructional indicia for installation of the retainer pin.

5. The brake system of claim 4 wherein the instructional indicia comprises a directional arrow disposed on the connector portion.

6. The brake system of claim 2 wherein the retainer bar comprises spaced apart first and second arms disposed adjacent the first and second ends of the anchor, and wherein the retainer lug is positioned between the first arm and the first end of the anchor.

7. The brake system of claim 6 wherein the washer lug is positioned outside of the second arm.

8. The brake system of claim 1 further comprising a capture component engaging an end of the retainer pin outside of the washer lug, wherein the capture component is configured to prevent the end of the retainer pin from passing through the opening of the washer lug.

9. The brake system of claim 8 wherein the capture component comprises a cotter pin.

10. The brake system of claim 1 wherein the pad shield further comprises a blocker feature spaced apart from the washer lug, wherein the blocker feature is configured to prevent the retainer pin from being first inserted through the washer lug and then into the through hole.

11. The brake system of claim 10 wherein the blocker feature is axially aligned with the opening of the washer lug.

12. A pad shield configured for installation on a brake system comprising:
   first and second shell sections;
   a cross member extending between and interconnecting the first and second shell sections; and
   a washer lug connected to the second shell section and having an opening defining a laterally extending axis, wherein the washer lug is configured to receive a retainer pin.

13. The pad shield of claim 12 further comprising a retainer lug connected to the first shell section and having an opening aligned with the opening of the washer lug along the laterally extending axis.

14. The pad shield of claim 12 further comprising a blocker feature connected to the second shell section, wherein the blocker feature is laterally spaced apart from the washer lug.

15. The pad shield of claim 12 wherein the blocker feature is axially aligned with the opening of the washer lug.

16. The pad shield of claim 13 further comprising a connector portion extending between the first shell section and the retainer lug, wherein the connector portion comprises instructional indicia for installing a retainer pin through the first and second openings.

17. The pad shield of claim 16 wherein the instructional indicia comprises a directional arrow disposed on the connector portion.

18. A method of assembling a brake system comprising:
   covering at least a portion of an opening in a caliper with a pad shield, wherein the caliper comprises an anchor having a through hole, and wherein the pad shield comprises a shell and a washer lug connected to the shell, wherein the washer lug has an opening;
   engaging the pad shield with a retainer bar;
   inserting a retainer pin successively through the through opening and the opening of the washer lug; and
   engaging the retainer bar with the retainer pin.

19. The method of claim 18 wherein the pad shield comprises a retainer lug connected to the shell, wherein the retainer lug has an opening aligned with the opening in the washer lug, and further comprising inserting the retainer pin through the opening in the retainer lug before inserting the retainer pin through the through opening.

20. The method of claim 18 further comprising engaging an end of the retainer pin downstream of the washer lug with a capture component and thereby preventing the end of the retainer pin from passing through the second opening of the washer lug.

21. The method of claim 18 wherein the pad shield further comprises a blocker feature connected to the shell and spaced apart from the washer lug, wherein the blocker feature is arranged and positioned to prevent the retainer pin from being successively inserted through the opening in the washer lug and then the through opening.

22. The method of claim 19 wherein the pad shield comprises a connector portion extending between the shell and the retainer lug, wherein the connector portion comprises instructional indicia for installation of the retainer pin.

23. The method of claim 20 wherein the retainer bar comprises spaced apart first and second arms disposed adjacent first and second ends of the anchor, wherein engaging the retainer bar with the retainer pin comprises engaging the first and second arms with the retainer pin, and wherein the washer lug is positioned between the second arm and the capture component.

\* \* \* \* \*